(12) United States Patent
Kamiyama et al.

(10) Patent No.: US 7,938,724 B2
(45) Date of Patent: May 10, 2011

(54) GAME DEVICE, GAME IMPLEMENTATION METHOD, PROGRAM AND RECORDING MEDIUM

(75) Inventors: Mitsuru Kamiyama, Tokyo (JP); Yasushi Matsumura, Kanagawa (JP); Hiroyuki Kuwata, Tokyo (JP); Hiroyuki Saegusa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 896 days.

(21) Appl. No.: 11/860,971

(22) Filed: Sep. 25, 2007

(65) Prior Publication Data

US 2008/0125202 A1 May 29, 2008

(30) Foreign Application Priority Data

Nov. 29, 2006 (JP) .............................. P2006-322208

(51) Int. Cl.
*A63F 9/24* (2006.01)
(52) U.S. Cl. .......................................... 463/31; 463/34
(58) Field of Classification Search .................... 463/31, 463/34
See application file for complete search history.

(56) References Cited

U.S. PATENT DOCUMENTS

| | | | |
|---|---|---|---|
| 6,609,976 B1 | 8/2003 | Yamagishi et al. | |
| 7,585,225 B2 * | 9/2009 | Minagawa | 463/33 |
| 7,824,265 B2 * | 11/2010 | Kobayashi | 463/33 |
| 2003/0027637 A1 | 2/2003 | Sato | |
| 2004/0176164 A1 * | 9/2004 | Kobayashi | 463/30 |
| 2007/0202936 A1 | 8/2007 | Ishii | |
| 2007/0265046 A1 | 11/2007 | Sato | |
| 2007/0265047 A1 | 11/2007 | Nomura | |
| 2007/0281791 A1 | 12/2007 | Ichikawa et al. | |
| 2008/0009352 A1 | 1/2008 | Aoyama et al. | |
| 2009/0305758 A1 * | 12/2009 | Nomura | 463/7 |

FOREIGN PATENT DOCUMENTS

| | | |
|---|---|---|
| JP | 2002 200351 | 7/2002 |
| JP | 2003 24636 | 1/2003 |

\* cited by examiner

*Primary Examiner* — Pierre E Elisca
(74) *Attorney, Agent, or Firm* — Greenblum & Bernstein, P.L.C.

(57) ABSTRACT

To improve game performance, in a three-dimensional video game in which a viewpoint position changes in accordance with a movement of a player character, considering an aspect of how to show a player an activation of a prescribed effect at a second object, forming a pair with a first object, for which the effect is set.

In a case in which an action source object 201 and an action target object 202 are displayed, within a display range which changes in accordance with a movement of a player character, on a second LCD 12, on a front surface of which a touch panel is disposed, when a line drawing operation is carried out on the touch panel from a display position of the action source object 201 to a display position of the action target object 202, a speed at which the line drawing operation is being carried out is calculated. In the event that the calculated speed is equal to or faster than a prescribed speed, as well as an effect display being done on a locus of the line drawing operation, an effect set for the action target object 202 is activated.

19 Claims, 6 Drawing Sheets

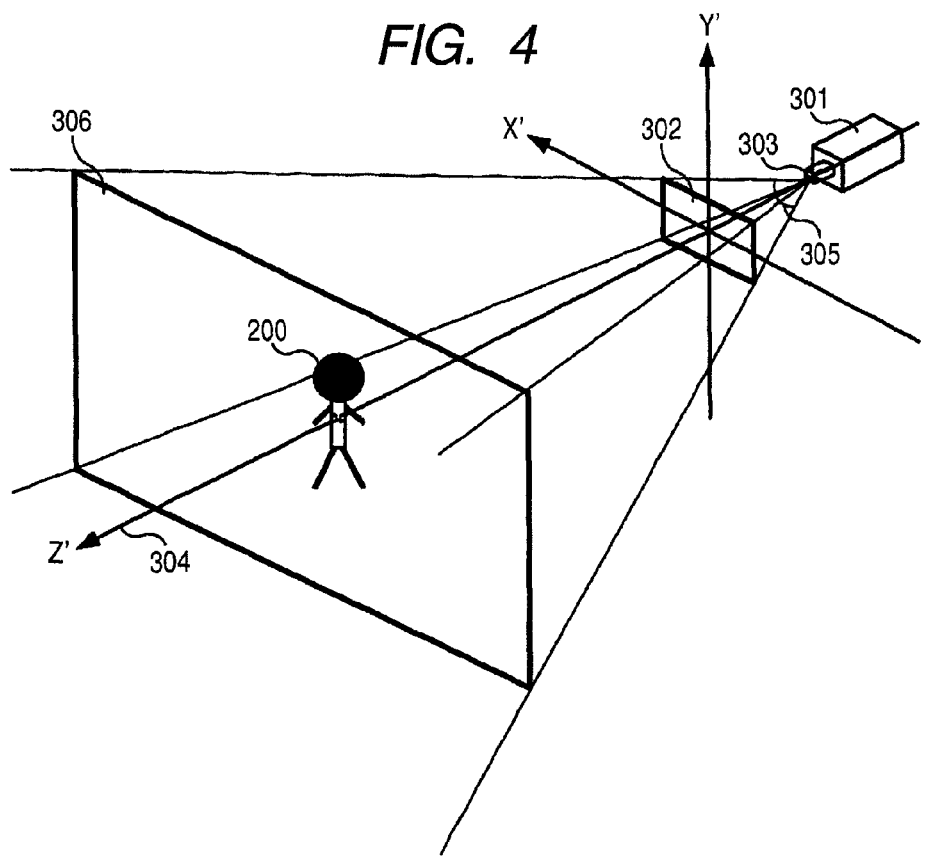

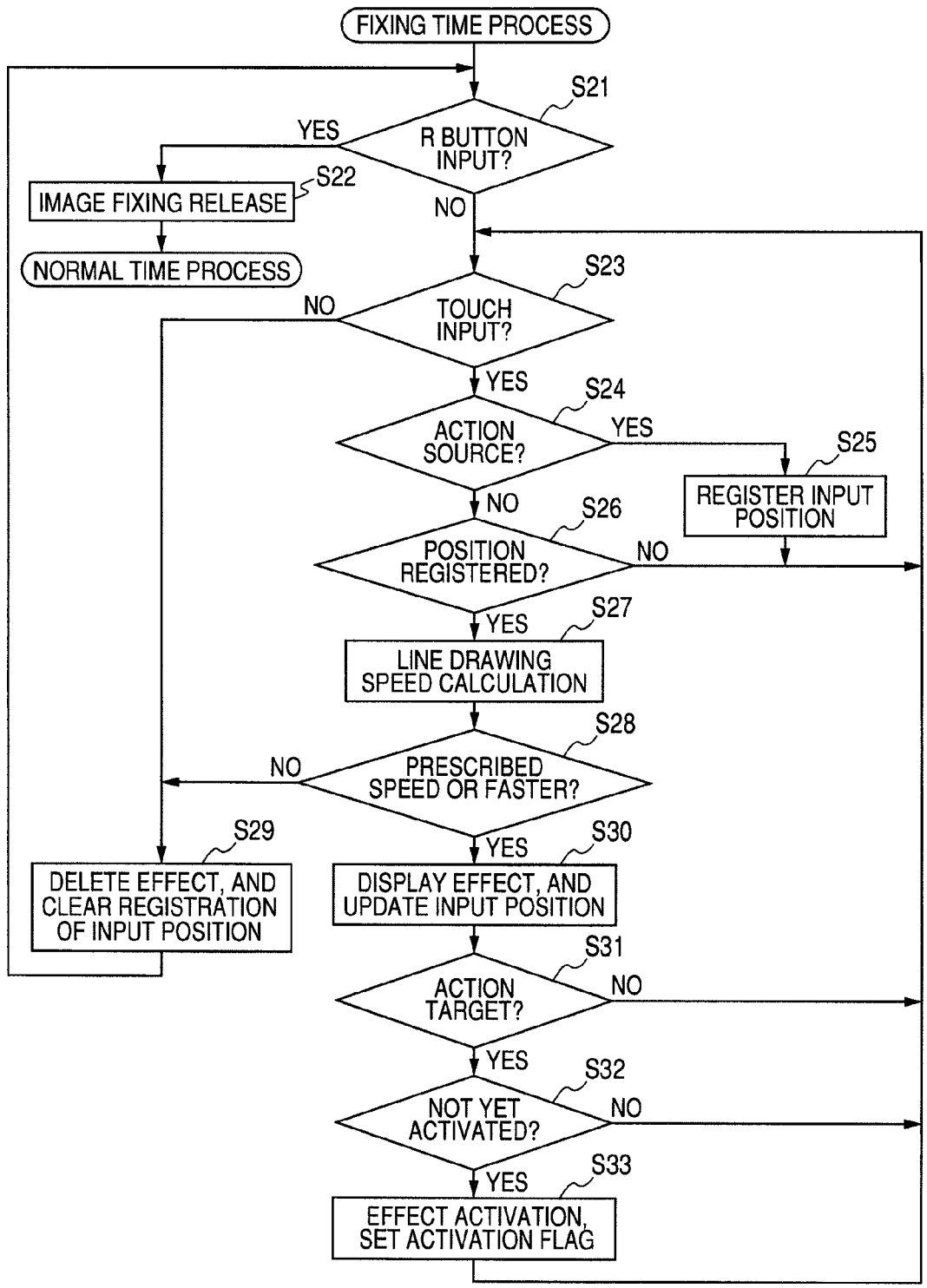

GAME DEVICE, GAME IMPLEMENTATION METHOD, PROGRAM AND RECORDING MEDIUM

The present disclosure relates to subject matter contained in Japanese Patent Application No. 2006-322208, filed on Nov. 29, 2006, the disclosure of which is expressly incorporated herein by reference in its entirety.

BACKGROUND OF THE INVENTION

1. Technical Field

The present invention relates to a game device or the like which, in a three-dimensional video game in which a viewpoint position of a virtual camera changes in accordance with a movement of a player character, activates a prescribed effect at a second object, forming a pair with a first object, for which the prescribed effect is set.

2. Related Art

To date, in a role playing game, a player has implemented a game by moving a player character in a virtual space. There is also one in which there is an action (hereafter, a special action) which can be implemented only when the player character, in a game implementation process, approaches a specified place (for example, a place in which there is a wooden box or the like) in the virtual space (for example, JP-A-2002-200351 (paragraph 0056 to paragraph 0057)).

Also, there is also a case in which, during a battle between the player character and an enemy character carried out in the game implementation process, a viewpoint position of a virtual camera, which perspective transforms the virtual space, is switched flexibly in accordance with a condition of the characters and an implementation status of the game (for example, JP-A-2003-24636 (paragraphs 0004 to 0005)).

However, in the game described in JP-A-2002-200351 (paragraphs 0056 to 0057), as long as the player moves the player character from the wooden box to a prescribed range, it is possible to carry out the special action by a prescribed operation, regardless of a display position of the wooden box on a display screen. Consequently, a way in which the player moves the player character in the virtual space has not had an effect on an execution of, or way of showing, the special action.

Considering a point of how to show the action to the player, even when using a method in the game described in JP-A-2003-24636 (paragraphs 0004 to 0005), in the event that the viewpoint position of the virtual camera switches in accordance with the condition of the characters and the implementation status of the game, a screen switches regardless of an operation by the player with respect to the switching of the viewpoint position of the virtual camera, and there is a danger of deteriorate game performance.

SUMMARY OF THE INVENTION

The invention has an object of providing a game device or the like which improves game quality, considering how to show to the player, in a three-dimensional game in which a viewpoint position changes in accordance with a movement of a player character, an activation of a prescribed effect at a second object, forming a pair with a first object, for which the effect is set.

In order to achieve the heretofore described object, a game device according to a first aspect of the invention includes: a character mover which, in accordance with an operation by a player, moves a player character in a virtual three-dimensional space, a first object, and a second object being provided in the virtual three-dimensional space, a prescribed effect being set for the second object, forming a pair with the first object; a viewpoint mover which moves a viewpoint of a virtual camera in accordance with the movement of the player character by the character mover; a perspective transformer which projects a prescribed range of the virtual three-dimensional space, including at least the player character, onto a virtual screen from a position of the viewpoint moved by the viewpoint mover, and generates a two-dimensional game image; and a game image display which displays the two-dimensional game image generated by the perspective transformer; and a coordinate position input which, in accordance with an operation by the player, inputs an optional coordinate position corresponding to a coordinate position on the game image display. In this case, the perspective transformer, when the player character moves within the prescribed range of the virtual three-dimensional space, sets the prescribed range for perspective transformation to project both the first object and the second object, along with the player character, onto the virtual screen, and display them on the game image display. The game device further includes: a game effect activator which, when a locus from a coordinate position in which the first object is displayed to a coordinate position in which the second object is displayed is input by the coordinate position input, where both the first object and the second object are displayed on the game image display, activates the prescribed effect, set for the second object, during an implementation of a game.

In the game apparatus according to the first aspect, in the case in which the player character is within the prescribed range of the virtual three-dimensional space, as long as the locus from the position of the first object to the position of the second object is input as a two-dimensional plane in the game image, the effect, set for the second object, during the implementation of the game is activated. Herein, the position of the viewpoint of the virtual camera changes in accordance with the movement of the player character, and the coordinate positions to be input by the coordinate position input device change in accordance with the position of the viewpoint of the virtual camera. By this means, the player being able to acquire an effect during the implementation of the game by inputting the coordinate positions which change in accordance with the position of the player character moved by his or her own operation, the game quality is improved.

It is possible to arrange in such a way that the game device according to the first aspect further includes: an effect display which, when both the first object and the second object are displayed on the game image display, applies the prescribed effect to the locus of the coordinate positions input by the coordinate position input, and displays the prescribed effect on the game image display, superimposed on the two-dimensional image of the game generated by the perspective transformer.

In this case, as long as the locus from the position of the first object to the position of the second object is input as the two-dimensional plane in the game image, the effect is applied to the input locus, and displayed, superimposed on the game image. Herein, by the locus from the first object to the second object being shown by the effect, and the effect being positioned at the second object, the effect set for the second object is activated. By this means, the first object and the second object forming a pair, the player can easily recognize that the prescribed effect has been activated.

In the game apparatus according to the first aspect, it is possible to arrange in such a way that the game effect activator, when the locus from the coordinate position in which the first object is displayed to the coordinate position in which the second object is displayed is input at, or faster than, a prescribed speed, activates the prescribed effect set for the second object.

Herein, in the case in which the game apparatus further includes the effect display, it is acceptable that the effect display, when the locus from the coordinate position in which the first object is displayed to the coordinate position in which the second object is displayed is input at, or faster than, the prescribed speed, applies the prescribed effect to the locus, and displays it on the game image display device.

In this case, the player, in order to acquire the effect during the implementation of the game set for the second object, has to input the locus from the position of the first object to the position of the second object, as the two-dimensional plane in the game image, at, or faster than, the prescribed speed. By there being a limit to the speed at which the locus is input, there is also a case in which it is comparatively difficult to input the locus from the first object to the second object. Herein, as the difficulty of the player acquiring the effect during the implementation of the game changes, the game performance is enhanced. Also, by the effect being displayed being conditional on the locus from the first object to the second object having been input at, or faster than, the prescribed speed, causing the activation of the prescribed effect, the player can recognize that the input causing the activation of the prescribed effect is being carried out.

In the game apparatus according to the first aspect, it is possible to arrange in such a way that the game effect activation system, on condition that the locus from the coordinate position in which the first object is displayed to the coordinate position in which the second object is displayed has been input within a prescribed time, activates the prescribed effect set for the second object.

Herein, in the case in which the game apparatus further includes the effect display system, it is acceptable that the effect display system, for only the duration of the prescribed time, applies the prescribed effect to the locus input from the coordinate position input device, and displays it on the game image display device.

In this case, the player, in order to acquire the effect during the implementation of the game set for the second object, has to input the locus from the position of the first object to the position of the second object, as the two-dimensional plane in the game image, within the prescribed time. By there being a limit to the time for inputting the locus, there is also a case in which it is comparatively difficult to input the locus from the first object to the second object. Herein, as the difficulty of the player acquiring the effect during the implementation of the game changes, the game performance is improved. Also, by the effect being displayed being limited within the prescribed time for which the input of the locus from the first object to the second object, to cause the activation of the prescribed effect, is necessary, the player can recognize that, the first object and the second object forming a pair, the input causing the activation of the prescribed effect is being carried out.

In the game apparatus according to the first aspect, it is possible to arrange in such a way that a plurality of the second objects forming pairs with the first object being formed in the virtual three-dimensional space, a prescribed effect during the implementation of the game is set for each of the plurality of second objects; the perspective transformer, when the player character is within a prescribed plurality of display ranges of the virtual three-dimensional space, sets the prescribed ranges for perspective transformation so that each of the plurality of second objects is projectable, along with the first object, onto the virtual screen, and display them on the game image display; and the game effect activator, when a locus, with the first object as an origin, passing through each of the plurality of second objects, is input by the coordinate position input, where the plurality of second objects are displayed on the game image display along with the first object, activates each of the prescribed effects during the implementation of the game set one for each of the second objects on the locus.

In this case, when the player character is within the plurality of display ranges of the virtual three-dimensional space, as long as the locus, with the position of the first object as the origin, passing through a position of each of the plurality of second objects, has been input as the two-dimensional plane in the game image, the effects during the implementation of the game set one for each of the second objects on the locus are activated. Even when the player character is within the plurality of display ranges of the virtual three-dimensional space, the viewpoint of the virtual camera moves further in accordance with a difference in position within the plurality of display ranges and, in a case in which the position of the viewpoint of the virtual camera is taken as a reference, the positional relationship between the first object and the plurality of second objects differs. In this way, the positional relationship between the first object and the plurality of second objects, as the two-dimensional plane in the generated game image, changes. Depending on the positional relationship between the first object and the plurality of second objects, the difficulty of inputting the locus, with the position of the first object as the origin, passing through all the plurality of second objects, changes.

This kind of positional relationship between the first object and the plurality of second objects on the two-dimensional plane being determined by the movement of the player character, when moving the player character, not simply causing the first object and the plurality of second objects to be displayed on the game image display device, but in what position they are caused to be displayed, also has an effect on the implementation of the game. By this means, by an input result of the movement of the player character via the character position mover effecting the input by the coordinate position input device of the locus from the first object to the second object, the game performance is improved.

Herein, it is also possible to arrange in such a way that the game effect activation system, on condition that the locus which passes through each of the plurality of second objects, with the coordinate position in which the first object is being displayed as the origin, has been input at, or faster than, a prescribed speed, activates all of the prescribed effects during the implementation of the game set one for each of the second objects on the locus.

Alternatively, it is also possible to arrange in such a way that the game effect activation system, on condition that the locus from the coordinate position in which the first object is displayed to the coordinate position in which the second object is displayed has been input within a prescribed time, activates the prescribed effect set for the second object.

In these cases, the player, in order to acquire the effects during the implementation of the game set one for each of the plurality of second objects, has to input the locus, with the position of the first object as the origin, passing through the position of each of the plurality of second objects, as the two-dimensional plane in the game image, at, or faster than, the prescribed speed (or alternatively, within the prescribed time). Depending on the positional relationship between the first object and each second object, as the two-dimensional plane in the game image, there is also a case in which it is comparatively difficult to input the locus in such a way as to pass through all the second objects when there is a restriction of having to do so at, or faster than, the prescribed speed (or alternatively, within the prescribed time).

This kind of positional relationship on the two-dimensional plane being determined by the movement of the player character, when moving the player character, not simply causing the first object and the plurality of second objects to be displayed on the game image display device, but in what position they are caused to be displayed, also has an effect on the implementation of the game. By this means, when moving the player character via the character position mover too, a more detailed operation being required, the game performance is improved.

In the game apparatus according to the first aspect, it is possible to arrange in such a way that a plurality of the second objects forming pairs with the first object being formed in the virtual three-dimensional space, prescribed effects during the implementation of the game are set for the plurality of second objects as a whole; the perspective transformer, when the virtual three-dimensional space of the player character is within a prescribed plurality of display ranges, sets the prescribed ranges to be perspective transformed in such a way that it is possible to project all the plurality of second objects, along with the first object, onto the virtual screen, and display them on the game image display device; and the game effect activator, when a locus, with the first object as an origin, passing through each of the plurality of second objects, has been input by the coordinate position input device, in the condition in which the plurality of second objects are displayed on the game image display device along with the first object, activates all of the prescribed effects during the implementation of the game set for the second objects on the locus as a whole.

In this case, when the player character is within the plurality of display ranges of the virtual three-dimensional space, as long as the locus, with the position of the first object as the origin, passing through a position of each of the plurality of second objects, has been input as the two-dimensional plane in the game image, the effects during the implementation of the game set for the second objects on the locus as a whole are activated. Even when the player character is within the plurality of display ranges of the virtual three-dimensional space, the viewpoint of the virtual camera moves further in accordance with the difference in position within the plurality of display ranges and, in the case in which the position of the viewpoint of the virtual camera is taken as the reference, the positional relationship between the first object and the plurality of second objects differs. In this way, the positional relationship between the first object and the plurality of second objects, as the two-dimensional plane in the generated game image, changes. Depending on the positional relationship between the first object and the plurality of second objects, the difficulty of inputting the locus, with the position of the first object as the origin, passing through all the plurality of second objects, changes.

This kind of positional relationship between the first object and the plurality of second objects on the two-dimensional plane being determined by the movement of the player character, when moving the player character, not simply causing the first object and the plurality of second objects to be displayed on the game image display device, but in what position they are caused to be displayed, also has an effect on the implementation of the game. By this means, by an input result of the movement of the player character via the character position mover effecting the input by the coordinate position input device of the locus from the first object to the second object, the game quality is enhanced.

Herein, it is also possible to arrange in such a way that the game effect activation system, on condition that the locus which passes through each of the plurality of second objects, with the coordinate position in which the first object is displayed as the origin, has been input at, or faster than, the prescribed speed, activates all of the prescribed effects during the implementation of the game set for the second objects on the locus as a whole.

Alternatively, it is also possible to arrange in such a way that the game effect activation system, on condition that the locus which passes through each of the plurality of second objects, with the coordinate position in which the first object is displayed as the origin, has been input within the prescribed time, activates all of the prescribed effects during the implementation of the game set for the second objects on the locus as a whole.

In the event that the plurality of second objects forming pairs with the first object are formed in this way, even when the player character is within the plurality of display ranges of the virtual three-dimensional space, the viewpoint of the virtual camera moves further in accordance with the difference in position within the plurality of display ranges and, in the case in which the position of the viewpoint of the virtual camera is taken as the reference, the positional relationship between the first object and the plurality of second objects differs. In this way, the positional relationship between the first object and the plurality of second objects (for example, whether or not they are aligned in a condition approximating a straight line), as the two-dimensional plane in the generated game image, changes. Depending on the positional relationship between the first object and each second object, there is also a case in which it is comparatively difficult to input the locus in such a way as to pass through all the second objects when there is a restriction of having to do so at, or faster than, the prescribed speed (or alternatively, within the prescribed time).

This kind of positional relationship on the two-dimensional plane being determined by the movement of the player character, when moving the player character, not simply causing the first object and the plurality of second objects to be displayed on the game image display device, but in what position they are caused to be displayed, also has an effect on the implementation of the game. By this means, when moving the player character via the character position mover too, a more detailed operation being required, the game performance is enhanced.

In the game apparatus according to the first aspect, it is possible to arrange in such a way that there exists in the virtual three-dimensional space an enemy character, which approaches the player character, and makes an attack on the player character.

In this case, it may happen that, while the movement of the player character is being stopped, and its direction of movement within a narrow range being repeatedly altered, the enemy character approaches the player character, and the player character undergoes an attack by the enemy character. For this reason, a practical temporal restriction arising for moving the position of the player character in such a way as to cause both the first object and the second object to be displayed on the game image display device without undergoing the attack by the enemy character, gaming performance other than simply moving the position arises for the movement operation of the player character.

In particular, in a case in which the positional relationship between the first object and the second object on the game image display device has an effect on the difficulty when inputting the coordinate position to activate the prescribed effect set for the second object, a temporal restriction also arises for trying to further adjust the display position in a condition in which the first object and the second object are already being displayed. By this means, in connection with the input operation of the coordinate position for activating the prescribed effect set for the second object, to be carried out subsequently, new gaming performance arises for the movement operation of the player character.

In the game apparatus according to the first aspect, it is possible to arrange in such a way that there exists in the virtual three-dimensional space, in a vicinity of the first object and the second object, a third object which invalidates the prescribed effect, and the game effect activation system, when the locus from the coordinate position in which the first object is displayed to the coordinate position in which the second object is displayed is input by the coordinate position input device, without passing through a coordinate position in which the third object is displayed, activates the prescribed effect, set for the second object, during the implementation of the game.

In this case, the positional relationship between the first object, the second object and the third object, as the two-dimensional plane in the game image, being determined by the movement of the player character, when moving the player character, not simply causing the first object and the second object to be displayed on the game image display device but furthermore, in addition to the first object and the second object, in what position the third object is caused to be displayed, also has an effect on the implementation of the game. By this means, by an input result of the movement of the player character via the character position mover more strongly effecting the input by the coordinate position input device of the locus from the first object to the second object, the gaming quality is improved.

In the game apparatus according to the first aspect, it is also acceptable that the first object and/or the second object move in the virtual three-dimensional space, while maintaining a distance between them within a prescribed range.

In this case, there arising a necessity of moving the player character in accordance with the movement of the first object and/or the second object, a further minuteness being required of the movement operation of the player character, it is possible to further improve game performance.

It is possible to arrange in such a way that the apparatus according to the first aspect further includes a player character stopping system which, in accordance with an operation by the player, stops the movement of the player character by the character mover, in which case the game effect activation system, when the locus from the coordinate position in which the first object is displayed to the coordinate position in which the second object is displayed is input by the coordinate position input device, in a condition in which the movement of the player character has been stopped by the player character stopping system, and both the first object and the second object are displayed on the game image display device, activates the prescribed effect.

In this case, the effect set for the second object can only be activated when the movement of the player character has been stopped. In the event that the player character has stopped, the viewpoint of the virtual camera also stops. Herein, it is possible to effectively show the player the activation of the effect set for the second object, without being affected by an implementation of another game.

In the apparatus according to the first aspect, it is possible to arrange in such a way that the viewpoint mover, when the player character is positioned within a vicinity range set in the vicinity of the first object and/or the second object, controls the movement of the viewpoint of the virtual camera in accordance with the movement of the player character differently from when the player character is positioned outside the vicinity range.

In this case, when the first object and the second object are displayed on the game image display device, a detailed viewpoint control is carried out. Herein, a considerable difference arising in the display positions of the first object and the second object on the game image display device, in accordance with the movement of the player character by the character position mover, when moving the player character via the character position mover too, a more detailed operation being required, the gaming performance is enhanced.

In the apparatus according to the first aspect, it is possible to arrange in such a way that the coordinate position input device, being disposed on a front surface of the game image display device, is a touch panel which transmissively shows an image displayed on the game image display device.

In this case, the player carries out the inputting of the coordinate position via the coordinate position input device on the touch panel disposed on the front surface of the game image display device. The player being able to input the locus of the positions of the first object and the second object being displayed on the game image display device by intuitively inputting the coordinates of the display positions via the touch panel, the gaming quality is improved.

In order to achieve the heretofore described object, a game implementation method according to a second aspect of the invention which, being executed in a apparatus including a display device which displays a game image, and a coordinate position input device which, in accordance with an operation by a player, inputs an optional coordinate position on the display device, implements a game by moving a player character in a virtual three-dimensional space, a first object, and a second object, for which a prescribed effect is set, forming a pair with the first object, includes: moving the player character in the virtual three-dimensional space, in accordance with an operation by the player; moving a viewpoint of a virtual camera in accordance with the movement of the player character; in the event that the player character has been moved within a prescribed range of the virtual three-dimensional space, setting a prescribed range to be perspective transformed in such a way that it is possible to project both the first object and the second object, along with the player character, onto a virtual screen, and display them on the display device, projecting the prescribed range of the virtual three-dimensional space, including at least the player character, onto the virtual screen from a position of a viewpoint of a virtual camera, and generating a two-dimensional game image; displaying the two-dimensional game image generated by the perspective transformation on the display device; and, when a locus from a coordinate position in which the first object is displayed to a coordinate position in which the second object is displayed is input by the coordinate position input device, in the condition in which both the first object and the second object are displayed on the display device, activating the prescribed effect, set for the second object, during the implementation of the game.

In order to achieve the heretofore described object, a program according to a third aspect of the invention causes a computer device, including a display device which displays an image of a game implemented by moving a player character in a virtual three-dimensional space, a first object, and a second object, for which a prescribed effect is set, forming a pair with the first object, and a coordinate position input device which, in accordance with an operation by a player, inputs an optional coordinate position on the display device, to function as: a character mover which moves the player character in the virtual three-dimensional space, in accordance with an operation by the player; a viewpoint mover which moves a viewpoint of a virtual camera in accordance with the movement of the player character by the character mover; a perspective transformer which, in the event that the player character has been moved within a prescribed range of the virtual three-dimensional space, sets a prescribed range to be perspective transformed in such a way that it is possible to project both the first object and the second object, along with the player character, onto a virtual screen, and display them on the display device, projects a prescribed range of the virtual three-dimensional space, including at least the player character, onto the virtual screen from a position of the viewpoint of the virtual camera moved by the viewpoint mover, and generates a two-dimensional game image; and a game image display system which displays the two-dimensional game image generated by the perspective transformer on the display device.

The program according to the third aspect can be provided recorded on a computer readable recording medium. It is acceptable that the computer readable recording medium, being configured in such a way as to be attachable to and removable from the computer device, is a recording medium provided separately from the computer device. It is also acceptable that the computer readable recording medium, being provided inside the computer device, is a recording medium such as a fixed disc device, provided along with the computer device. It is also possible that the program according to the third aspect is delivered from a server device existing on a network, its data signal being superimposed on a carrier wave, via the network to the computer device.

BRIEF DESCRIPTION OF THE DRAWINGS

FIG. 3 shows an action management table which manages action source objects, and action target objects which form pairs with the action source objects, in an action RPG according to the embodiment of the invention;

FIG. 4 is a view schematically showing a process for a perspective transformation and display of a virtual three-dimensional space, including a player character, in the action RPG according to the embodiment of the invention;

FIGS. 5A-1 and 5B-1 are views showing an example of a second LCD, at a time of fixing images, in the action RPG according to the embodiment of the invention;

FIGS. 5A-2 and 5B-2 are illustrations schematically showing a positional relationship between an action source object and action target objects in FIGS. 5A-1 and 5B-1 respectively;

FIG. 7 is a flowchart showing a process carried out at the time when the images are fixed, in the action RPG according to the embodiment of the invention.

DESCRIPTION OF THE PREFERRED EMBODIMENT(S)

Hereafter, a description will be given of an embodiment of the invention, referring to the attached drawings.

Figure 1:
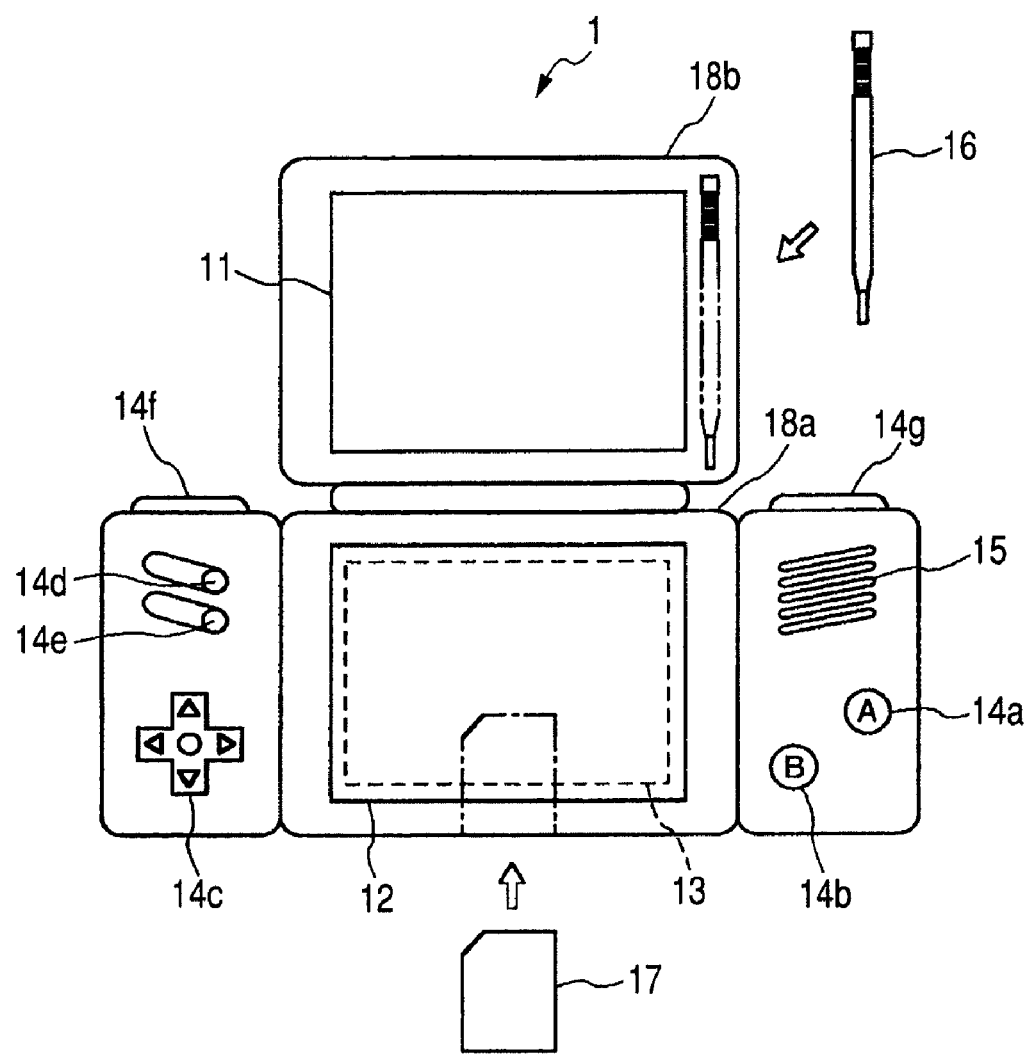
FIG. 1 is an external view showing a configuration of a apparatus applied to an embodiment of the invention.

FIG. 1 is an outline view showing a configuration of a apparatus 1 applied to the embodiment. Herein, a portable apparatus is shown as one example of the apparatus 1. In FIG. 1, the apparatus 1 is configured housing two liquid crystal displays (LCD's) 11 and 12 in a housing 18, in such a way that they are in prescribed disposition positions.

In a case in which a first liquid crystal display (hereafter referred to as an LCD) 11 and a second LCD 12 are housed disposed one on top of the other, the housing 18 being configured of a lower housing 18a and an upper housing 18b, the upper housing 18b is supported in such a way as to be pivotable about one portion of a top edge of the lower housing 18a. In the upper housing 18b, which has a flat form slightly bigger than a flat form of the first LCD 11, an opening is formed in such a way as to expose a display screen of the first LCD 11 through one principal surface. In the lower housing 18a, a flat form of which is chosen to be horizontally longer than the upper housing 18b, an opening which exposes a display screen of the second LCD 12 is formed in an approximately central portion of a horizontal direction and, as well as sound outlet apertures of a speaker 15 being formed on one of right and left sides sandwiching the second LCD 12, operating switches 14 are attached to the right and left sides.

The operating switches 14 include an action switch (hereafter referred to as an "A button") 14a and an action switch (hereafter referred to as a "B button") 14b, a direction indicating switch (hereafter referred to as a "arrow key") 14c, a start switch 14d, a selection switch 14e, a side switch (hereafter referred to as an "L button") 14f and a side switch (hereafter referred to as an "R button") 14g.

The A button 14a and the B button 14b are attached to one principal surface of the lower housing 18a, to a right side of the second LCD 12. The A button 14a and the B button 14b are used, for example, in an action role playing game (hereafter referred to as an "action RPG") applied in the embodiment, to input an instruction to attack an enemy character, or the like. The arrow key 14c is attached to one principal surface of the lower housing 18a, to a left side of the second LCD 12. The arrow key 14c is used for a direction instruction on a game screen, such as instructing a movement direction of a player object (a player character in the embodiment), operable by a player using the operating switches 14, or instructing a movement direction of a cursor.

The L button 14f and the R button 14g are provided on a right and left of a top surface (a top side surface) of the lower housing 18a. In the action RPG applied in the embodiment, the L button 14f is used to input an instruction to interchange an image being displayed on the first LCD 11 and an image being displayed on the second LCD 12, and fix images to be displayed on the first LCD 11 and second LCD 12 as the relevant images (hereafter referred to as an "image fixing"). The R button 14g is used to input an instruction to release the fixing of the images of the first LCD 11 and second LCD 12 (also including the interchange) (hereafter referred to as an "image fixing release").

At a normal time, the game screen (one which is generated by a perspective transformation of a virtual three-dimensional space) is displayed on the first LCD 11, and a command selection screen is displayed on the second LCD 12. On the command selection screen displayed on the second LCD 12 at the normal time, a selection of a command is accepted by a touch on a touch panel. At an image fixing time, the command selection screen is displayed on the first LCD 11, and the game screen is displayed on the second LCD 12. On the game screen displayed on the second LCD 12 at the image fixing time, a line drawing operation, to be described hereafter, is accepted, but the selection of the command is not accepted.

The touch panel 13 (an area delineated by a broken line in FIG. 1) is attached to a top surface of the second LCD 12. The touch panel 13, which can be any kind among, for example, a resistive type, an optical type (an infrared type), or a capacitive coupling type, is one which, when a pressing operation or a movement operation has been carried out on its top surface using a stick 16 (or, as is also possible, a finger), detects and transmits a coordinate position of the stick 16. In the action RPG applied in the embodiment, the touch panel 13 is used, in a condition in which the images are fixed, to input an instruction implementing an effect from an action source object against an action target object.

In the event that, in order to produce the effect, a coordinate position of the action source object displayed on the second LCD 12, in the condition in which the images are fixed, is touched on the touch panel 13, and the touch is continued to another coordinate position on the touch panel 13, the operation is taken to be that known as the line drawing operation. When the line drawing operation is carried out in the condition in which the images are fixed, a speed at which the operation is being carried out is calculated and, in the event only that the calculated speed is equal to or greater than a prescribed speed, an effect is displayed on the second LCD 12, applied to a range of a certain width, centered on positions input by the line drawing operation on the touch panel 13, and the effect occurs for the action target object.

A storage slot (an area delineated by a two-dot broken line in FIG. 1) for storing the stick 16 which operates, when necessary, the touch panel 13 is formed in a vicinity of a side surface of the upper housing 18b. The stick 16 is stored in the storage slot. A cartridge insertion portion (an area delineated by a one-dot broken line in FIG. 1) for removably attaching a game cartridge 17 (hereafter referred to as a "cartridge 17") which contains a memory (for example, an ROM) in which a game program is stored, is formed in a portion of a side surface of the lower housing 18a. The cartridge 17 being an information storage medium which stores the game program, a non-volatile semiconductor memory such as, for example, an ROM or a flash memory, is used. A connector for electrically connecting with the cartridge 17 (refer to FIG. 2) is built into an interior of the cartridge insertion portion. Furthermore, an electronic circuit substrate on which are mounted various electronic parts, such as a CPU, is housed in the lower housing 18a (or, as is also possible, in the upper housing 18b).

Figure 2:
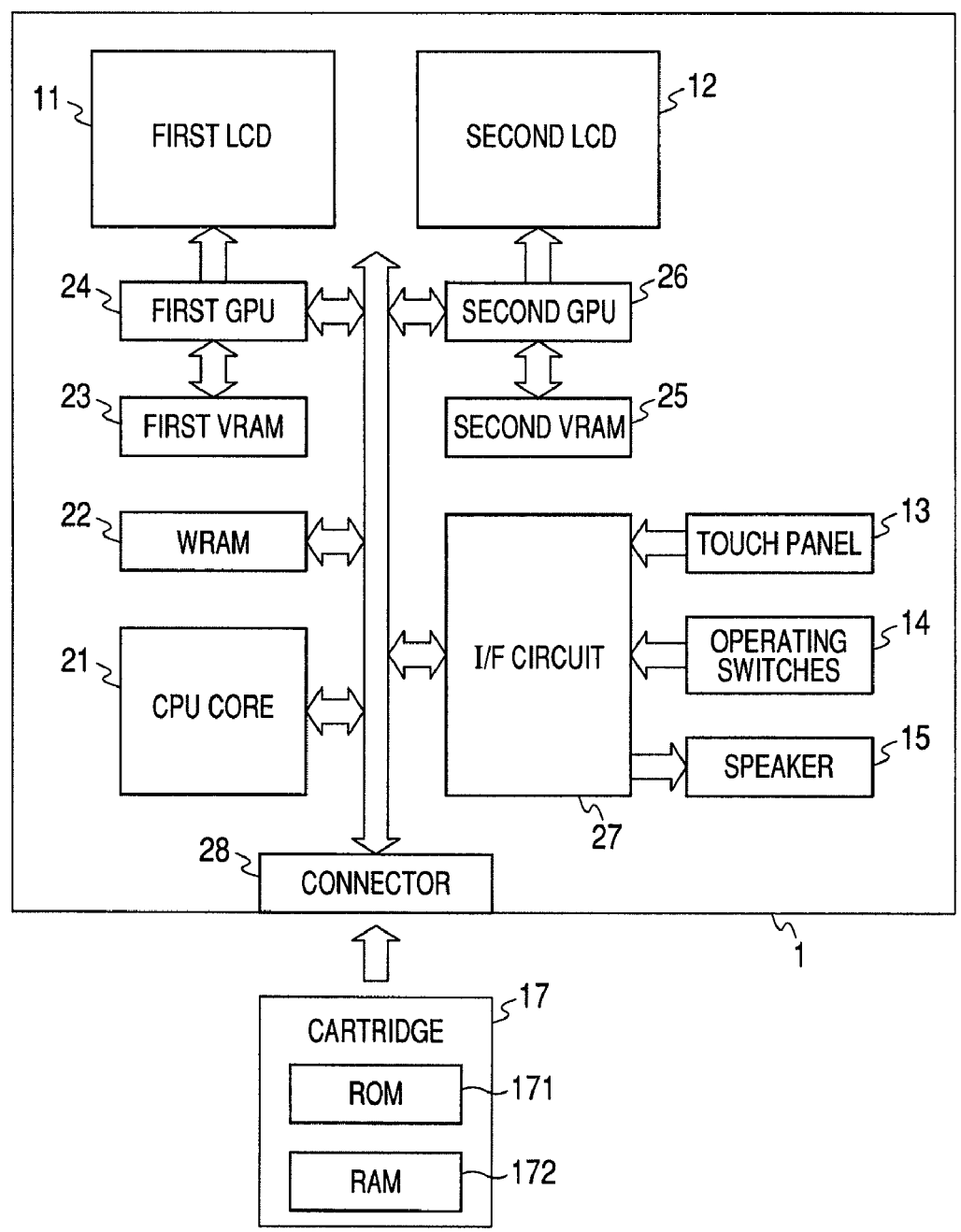
FIG. 2 is a block diagram showing a circuit configuration of the apparatus applied to the embodiment of the invention.

Next, a description will be given of a circuit configuration of the apparatus 1. FIG. 2 is a block diagram showing the circuit configuration of the apparatus 1. In FIG. 2, a CPU core 21 is mounted on the electronic circuit substrate housed in the housing 18. As well as the connector 28 for connecting with the cartridge 17 being connected, an input-output interface (I/F) circuit 27, a first graphics processing unit (first GPU) 24, a second graphics processing unit (second GPU) 26, and a working RAM (WRAM) 22 are connected, via a prescribed bus, to the CPU core 21.

The cartridge 17 is removably connected to the connector 28. The cartridge 17, being the storage medium for storing the game program, as heretofore described, specifically, is loaded with an ROM 171 which stores the game program, and an RAM 172, which stores backup data in such a way that they are rewritable. The game program stored in the ROM 171 of the cartridge 17 is loaded into the WRAM 22, and the game program loaded into the WRAM 22 is executed by the CPU core 21. Data for generating temporary data and images obtained by the CPU core 21 executing the game program are stored in the WRAM 22. The game program, which is a group of orders and a group of data of formats which can be executed by a computer of the apparatus 1, in particular by the CPU core 21, is stored in the ROM 171. Then, the game program is read and executed as appropriate by the WRAM 22.

A first video RAM (hereafter referred to as a "VRAM") 23 is connected to the first GPU 24, while a second video RAM (hereafter referred to as a "VRAM") 25 is connected to the second GPU 26. The first GPU 24, in accordance with an instruction from the CPU core 21, generates a first game image based on the data for generating the images stored in the WRAM 22, and draws it in the first VRAM 23. The second GPU 26, in accordance with an instruction from the CPU core 21, generates a second game image based on the data for generating the images stored in the WRAM 22, and draws it in the second VRAM 25.

The first GPU 24 is connected to the first LCD 11, while the second GPU 26 is connected to the second LCD 12. The first GPU 24 transmits the first game image, drawn in the first VRAM 23 in accordance with the instruction from the CPU core 21, to the first LCD 11. Then, the first LCD 11 displays the first game image transmitted from the first GPU 24. The second GPU 26 transmits the second game image, drawn in the second VRAM 25 in accordance with the instruction from the CPU core 21, to the second LCD 12. Then, the second LCD 12 displays the second game image transmitted from the second GPU 26.

The touch panel 13, the operating switches 14, and the speaker 15 are connected to the I/F circuit 27. The I/F circuit 27 is a circuit which carries out a passing of data between the CPU core 21 and external input-output devices, such as the touch panel 13, the operating switches 14, and the speaker 15.

The touch panel 13 (including a device driver for the touch panel), having a coordinate system corresponding to a coordinate system of the second VRAM 25, transmits coordinate data corresponding to a position input (instructed) by the stick 16 or the like to a prescribed register provided in the WRAM 22. For example, a resolution of the display screen of the second LCD 12 being 256 dots by 192 dots, a detection accuracy of the touch panel 13 is also 256 dots by 192 dots, corresponding to the display screen. It is also acceptable that the detection accuracy of the touch panel 13 is either lower or higher than the resolution of the display screen of the second LCD 12. The speaker 15, being disposed in a position inside the heretofore described sound outlet apertures, transmits a sound generated in accordance with a game being executed.

Hereafter, a description will be given of a game executed in the embodiment by the apparatus 1 shown in FIG. 1 and FIG. 2. The game according to the embodiment being the action RPG, a field is formed in the virtual three-dimensional space, which is a player character movement space, and the player implements the game while moving the player character on the field by operating the operating switches 14 (the arrow key 14c). An enemy character, which appears when the player character moves to a prescribed point on the field, and moves in such a way as to come closer to the player character, carries out an attack on the player character in the event that a distance from the player character in the virtual three-dimensional space reaches a prescribed distance. A movement speed of the enemy character in the virtual three-dimensional space is equal to or less than a maximum movement speed of the player character.

The player character, using a weapon or magic, can attack the enemy character, or defend against the attack by the enemy character. By the player character carrying out an attack on the enemy character, or undergoing the attack by the enemy character, it can happen that a position of the player character in the virtual three-dimensional space automatically moves, even without the operation of the arrow key 14c.

The player, by having the player character use the magic in accordance with a progress of the game, can implement the game to his or her advantage. Also, action source objects, and action target objects which form pairs with the relevant action source objects, exist in prescribed positions on the field. An effect in the game, to be described hereafter, is set for each action target object. The effect is activated by the line drawing operation from the action source object to the action target object being carried out at, or faster than, a prescribed speed.

Next, a description will be given of data managed in the WRAM 22 of the apparatus 1, in the action RPG according to the embodiment. FIG. 3 shows an action management table which manages the action source objects, and the action target objects which form pairs with the relevant action source objects. As shown in FIG. 3, an action source number 101, an action source position 102, an action target number 103, an action target position 104, an effect 105, and an activation flag 106 are registered, for each action target object which forms a pair with the relevant action source object, in the action management table 100.

The action source number 101 is identification information which uniquely identifies each action source object. The action source position 102 shows a position of each action source object in the virtual three-dimensional space by coordinates set in a game space.

The action target number 103 is identification information which uniquely identifies each action target object. It can also happen that there exist a plurality of action target objects which form pairs with one action source object. For example, there are two action target objects which have a pair relationship with an action source object of which the action source number 101 is 2, while there are three action target objects which have a pair relationship with an action source object of which the action source number 101 is 3. The action target position 104 indicates a position of each of the action target objects in the virtual three-dimensional space by coordinates set in the game space.

The effect 105 is an effect, during the implementation of the game, set against the relevant action target object. In the event that there exist a plurality of action target objects which form pairs with one action source object, the effect 105 is set against each action target object, but it is also possible to implement the effects simultaneously with one line drawing operation for as long as the line drawing operation continues at, or faster than, the prescribed speed. There are various kinds of the effect 105, such as turning on a light in darkness, linking a non-displayed bridge, adding a parameter set for the player character, or carrying out an attack on the enemy character.

The activation flag 106 is a flag set for an action target object against which an effect set against the action target object has already been activated. The activation flag 106 is set when the line drawing operation is carried out from an action source object to an action target object, which have a pair relationship. An activation flag 106 which has once been set is not reset.

Next, a description will be given of the game image displayed on the first LCD 11 or the second LCD 12. The positions of the player character, the action source objects and the action target objects on the field of the virtual three-dimensional space are each uniquely specified by coordinates of a world coordinate system (X, Y, Z). Graphic data of the objects (including the action source objects and the action target objects) existing on the field, are all configured of a plurality of polygons, coordinates of vertices of which are indicated by coordinates of the world coordinate system.

The player character is configured of a plurality of polygons, coordinates of vertices of which are indicated by coordinates of a local coordinate system (x, y, z). An approximate central point of the player character being set as a reference point, its position in the virtual three-dimensional space is indicated by coordinates of the world coordinate system of the reference point. Also, a direction of the player character is represented by an angle which each axis of the local coordinate system forms with each axis of the world coordinate system.

Then, when carrying out a display process, coordinates of feature points (the vertex of each polygon) of all objects included in a visible range are converted into coordinates of the world coordinate system. Also, a direction of movement of the player character is determined based on a relationship between a position of the player character in a current frame period, and a position of the player character in an immediately preceding frame period.

An aspect of the player character moving on the field in the virtual three-dimensional space is depicted on the first LCD 11 or the second LCD 12, and is recognized by the player. An image (the game image) in which the virtual three-dimensional space has been perspective transformed by a virtual camera, a viewpoint of which is set in a prescribed position with the player character as the reference point, is displayed on the first LCD 11 (on the second LCD 12 at the image fixing time). An image (the command selection screen) in which a plurality of kinds of command are included is displayed on the second LCD 12 (on the first LCD 11 at the image fixing time).

FIG. 4 schematically shows an aspect of a perspective transformation of the virtual three-dimensional space by the virtual camera which displays the image on the first LCD 11 (on the second LCD 12 at the image fixing time). The virtual camera 301 is placed in the virtual three-dimensional space, and an image projected onto a virtual screen 302 becomes the image displayed on the first LCD 11 (on the second LCD 12 at the image fixing time).

The position of the virtual camera 301 is the viewpoint 303, an orientation of the virtual camera 301 is a visual axis 304, and an area formed by four straight lines, which join the viewpoint 303 and four corner vertices of the virtual screen 302, is a field of view 305. A size of the virtual screen 302 being fixed, there is a relationship such that by determining an area of the field of view 305, a position of the virtual screen 302 is determined, and by determining the position of the virtual screen 302, the area of the field of view 305 is determined. Also, a rear clip plane 306 is fixed at a prescribed distance from the viewpoint 303 in a direction of the visual axis 304. In the embodiment, it is taken that a position in which a front clip plane is set is the same as a position in which the virtual screen 302 is set. A clipping range, that is, a range in the virtual three-dimensional space in which images are generated by perspective transformation (that is, the visible range), is a range from the virtual screen 302 to the rear clip plane 306 within a range of the field of view 305.

In this way, a coordinate system used for projecting the image onto the virtual screen 302 being a viewpoint coordinate system (X', Y', Z'), the direction of the visual axis 304 is a Z' axis of the viewpoint coordinate system. The coordinates of the world coordinate system (including the coordinates converted from the coordinates of the local coordinate system) being converted into coordinates of the viewpoint coordinate system, a perspective transformation process, including a hidden surface removal process to be shown next, is carried out.

When generating the images projected onto the virtual screen 302 by perspective transformation, it is necessary to carry out a hidden surface removal removing a surface which is hidden by another object being in front. Herein, as a hidden surface removal method, a Z buffer method is used. On converting the coordinates of the world coordinate system into the coordinates of the viewpoint coordinate system, the CPU core 21, as well as sending the coordinates of each feature point to the first GPU 24 (to the second GPU 26 at the image fixing time), transmits a drawing order. Based on the drawing order, the first GPU 24 (the second GPU 26 at the image fixing time) updates a value of a Z buffer in such a way that data (a value of Z') of a point on a front surface (a small point of Z' coordinates) remain for each feature point and, for every update, transmits image data for the relevant points to the first VRAM 23 (to the second VRAM 25 at the image fixing time).

As prerequisites for carrying out the perspective transformation, it is necessary that the position of the viewpoint 303, the direction of the visual axis 304, and the size of the field of view 305 (the distance from the viewpoint 303 to the virtual screen 302) of the virtual camera 301, and the distances from the viewpoint 303 to the front clip plane and the rear clip plane 306 (hereafter referred to as the "clipping distances"), are decided (by these being decided, the position of the virtual screen 302 is automatically decided). Naturally, in the game according to the embodiment, it is taken that the direction of the visual axis 304, the size of the field of view 305, and the clipping distances are set at constant values.

In the event that the position of the player character 200 on the field of the virtual three-dimensional space is more than a prescribed distance (10) from a position of an action source object, the position of the viewpoint 303, being maintained in a position a certain distance, in a prescribed direction, from the player character 200, moves in pursuit of the player character 200.

In the event that the position of the player character 200 is within the prescribed distance (10) from the position of the action source object, the position of the viewpoint 303 changes slightly in accordance with a positional relationship of the action source object and the player character 200. Consequently, as the position of the viewpoint 303 of the virtual camera 301 changes considerably when the position of the player character 200 on the field of the virtual three-dimensional space changes even a little, positions of the action source object and action target object displayed on the first LCD 11 (on the second LCD 12 at the image fixing time) change considerably, and coordinate positions at which a line drawing input is to be carried out change considerably.

Particularly in the event that a plurality of action target objects which form pairs with one action source object have been set, depending on differences in positional relationships between the position of the action source object and a position of each of the plurality of action target objects, displayed on the first LCD 11 (on the second LCD 12 at the image fixing time), a difficulty of the line drawing operation on the touch panel 13 (that is, whether or not it is easily possible to maintain the prescribed speed or greater in the line drawing operation) changes.

Figures 1, 5A:
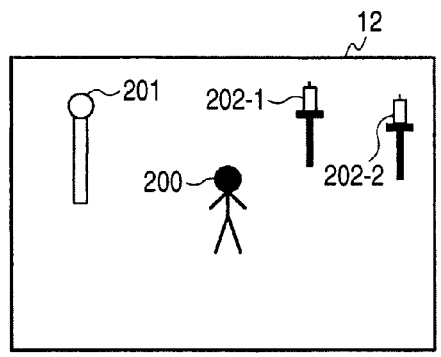
Figures 1, 5B:
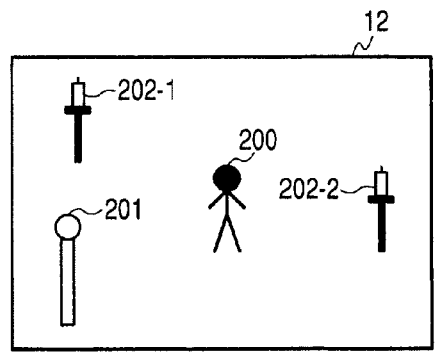
Figures 2, 5A:
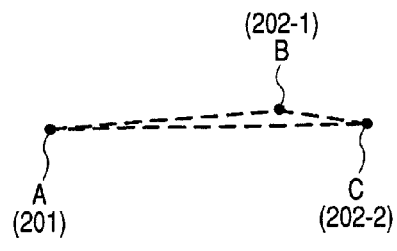
Figures 2, 5B:
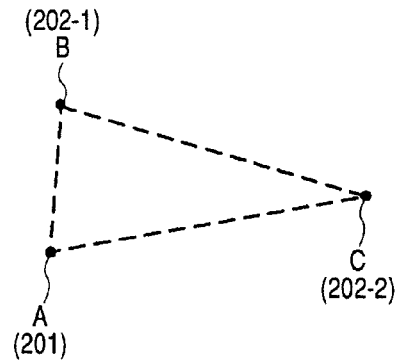

FIGS. 5A-1 and 5B-1 are views showing an example of the second LCD 12 in the condition in which the images are fixed. As shown in FIGS. 5A-1 and 5B-1, a player character 200, an action source object 201, and two action target objects 202-1 and 202-2, which form pairs with the action source object 201, are displayed on the second LCD 12. In FIG. 5A-1 and FIG. 5B-1, positions of the action source object 201 and the two action target objects 202, displayed on the second LCD 12, differ.

FIGS. 5A-2 and 5B-2 schematically show the position of the action source object 201 as point A, the position of the action target object 202-1 as point B, and the position of the action target object 202-2 as point C. In FIG. 5A-2, an angle ABC formed between a direction heading toward point B from point A, and a direction heading toward point C from point B, is an obtuse angle. In FIG. 5B-2, the angle ABC formed between the direction heading toward point B from point A, and the direction heading toward point C from point B, is an acute angle. An angle ACB is also an acute angle. Also, in FIG. 5B-2, as point B and point C both have the action target objects 202 positioned on an edge portion of the second LCD 12, it being difficult to smoothly change direction, it is easy for the line drawing speed to decrease.

Contrarily, in comparison with carrying out a line drawing operation from point A to point B, and point B to point C, in FIG. 5B-2, when carrying out the line drawing operation from point A to point B, and point B to point C, in FIG. 5A-2, a large direction change not being necessary, it is also possible to smoothly change direction, so a decrease in the line drawing speed at point B is only small. When carrying out a line drawing operation from point A to point C, and point C to point B, in FIG. 5B-2 too, it is easy for the line drawing speed to decrease at point C.

Although the player, if possible, would like to carry out the image fixing in FIG. 5A-1, in which it is easy to carry out the line drawing, as an enemy character, of which a distance from the player character 200 has reached the prescribed distance, carries out an attack on the player character in the virtual three-dimensional space, the player is not given time to unhurriedly move the player character 200 on the field. In order to avoid undergoing an unwanted attack by the enemy character before: thinking about a subsequent line drawing operation, an adroit operation is required of the player at this point.

Hereafter, a description will be given of processes executed, in the action RPG according to the embodiment, in order to execute the game in the apparatus 1 shown in FIGS. 1 and 2. Naturally, at this point, a description will be given only of processes relevant to the invention, that is, only a normal time process which moves the player character 200, and a fixing time process which fixes the image, and carries out the line drawing input. A process for displaying images of the game, by means of perspective transformation, on the first LCD 11 (the second LCD 12 in the fixing time process, to be described hereafter), in accordance with a control of the viewpoint 303 of the virtual camera 301, is carried out separately.

Figure 6:
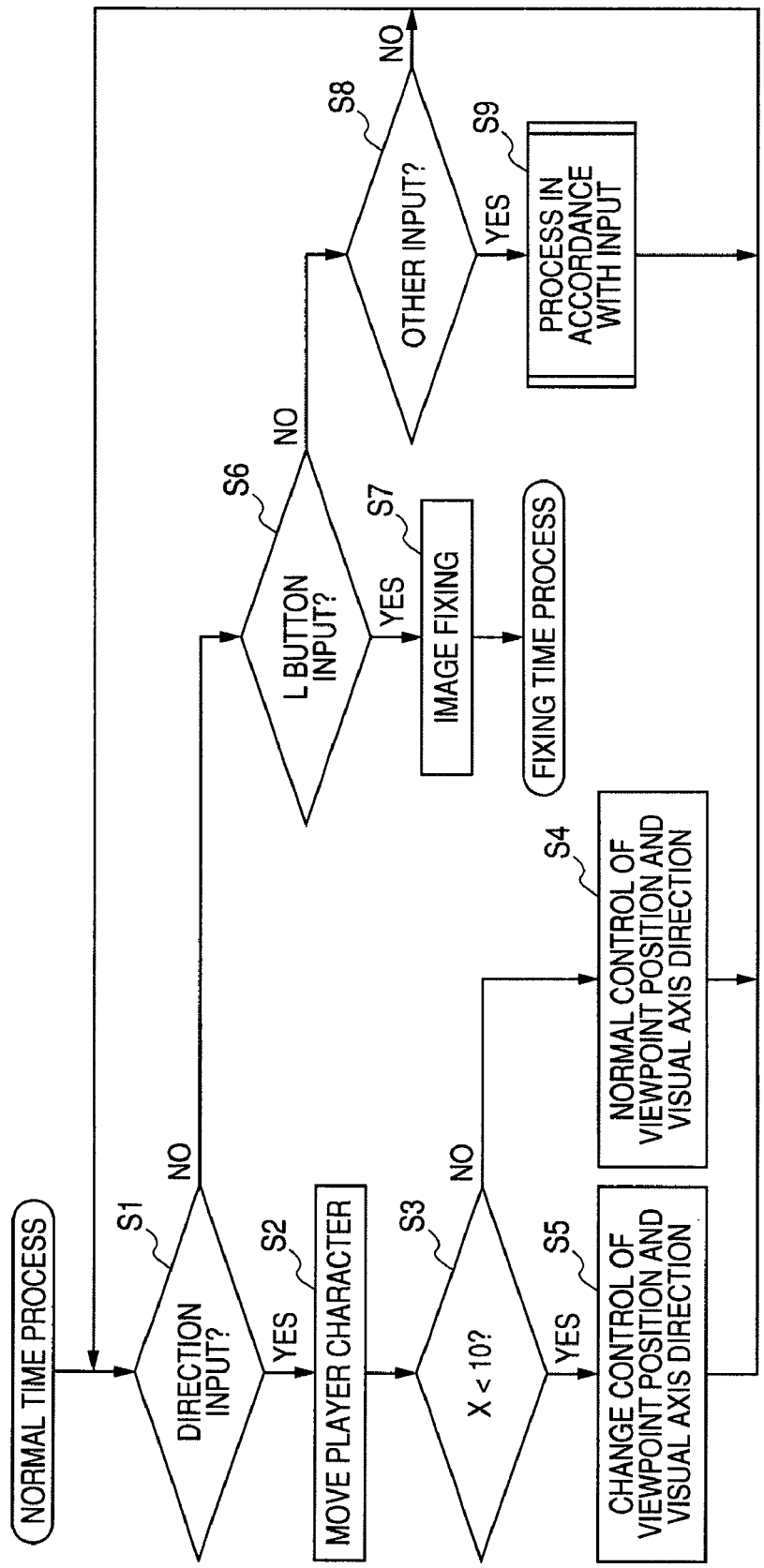
FIG. 6 is a flowchart showing a process for operating the player character at a normal time, when the images are not fixed, in the action RPG according to the embodiment of the invention.

FIG. 6 is a flowchart showing the process for operating the player character 200 at the normal time, when the images are not fixed, in the action RPG according to the embodiment. The process of the flowchart is a process in which the CPU core 21 executes the game program loaded from the ROM 171 of the cartridge 17 into the WRAM 22. Although not in the flow, in the normal time process, in particular in a condition in which the action source object 201 is displayed, an enemy character approaches the player character, and carries out an attack.

In the normal time process, the CPU core 21 determines whether or not any direction has been input from the arrow key 14c (step S1). If a direction has been input from the arrow key 14c, the CPU core 21 moves the player character 200 on the field in accordance with the relevant direction (step S2). The CPU core 21 determines whether or not an action source object 201, of which a distance X between the position of the player character 200 and the action source position 102 on the field of the virtual three-dimensional space is less than 10, has been registered in the action management table 100 (step S3).

If there is no action source object 201 within a range of 10 from the position of the player character 200, the CPU core 21, with a control of the position of the viewpoint 303 of the virtual camera 301 as a normal control (a control causing the virtual camera 301 to pursue the player character 200), displays the image on the first LCD 11 (step S4). Then, the CPU core 21 returns to the process of step S1.

If there is an action source object 201 within the range of 10 from the position of the player character 200, the CPU core 21 changes the control of the position of the viewpoint 303 of the virtual camera 301 from the normal control (to a control which carries out a prescribed calculation in accordance with a positional relationship between the player character 200, the action source object 201, and the action target objects 202, and moves the position of the viewpoint 303), and displays the image on the first LCD 11 (step S5).

If no direction has been input from the arrow key 14c, the CPU core 21 determines whether or not there has been an input from the L button 14f (step S6). If there has been an input from the L button 14f, the CPU core 21 interchanges an image being displayed at the present moment on the first LCD 11 with an image being displayed on the second LCD 12, and sends an instruction to the first GPU 24 and second GPU 26 to fix the displays of the first LCD 11 and second LCD 12 with the relevant images (step S7). Then, the CPU core 21 shifts to the fixing time process. Details of the fixing time process will be given hereafter.

If there has been no input from the L button 14f, the CPU core 21 determines whether or not there has been another input from the operating switches 14 (apart from the arrow key 14c and the R button 14g), or the touch panel 13 (step S8). If there has been another input from the operating switches 14 (apart from the arrow key 14c and the R button 14g), or the touch panel 13, the CPU core 21 carries out a process in accordance with the relevant input (for example, causing the player character 200 to attack the enemy character) (step S9). Subsequently, the CPU core 21 returns again to the process of step S1. If there has been no other input either, the CPU core 21 returns directly to the process of step S1.

FIG. 7 is a flowchart showing the process carried out at the time when the images are fixed, in the action RPG according to the embodiment. When the images are fixed, the movements of the player character 200 and the enemy character are also fixed. In the fixing time process, the CPU core 21 determines whether or not there has been an input from the R button 14g (step S21). If there has been an input from the R button 14g, the CPU core 21 sends an instruction to the first GPU 24 and the second GPU 26 to finish the fixing of the images carried out in step S7 (step S22). Then, the CPU core 21 shifts to the previously described normal time process.

If there has been no input from the R button 14g, the CPU core 21 determines whether or not the touch panel 13 has been touched, and any of its coordinate positions been input (step S23). If no coordinate position has been input from the touch panel 13, the CPU core 21 proceeds to a process of step S29. If a coordinate position has been input from the touch panel 13, the CPU core 21 determines whether or not the input coordinate position is the position in which the action source object 201 is being displayed (step S24).

If the input coordinate position is the position in which the action source object 201 is being displayed, the CPU core 21 registers the input coordinate position in the WRAM 22 (step S25). Then, the CPU core 21 returns to the process of step S23. If the input coordinate position is not the position in which the action source object 201 is being displayed, the CPU core 21 determines whether or not the coordinate position has been registered in the WRAM 22 (step S26). If the coordinate position has not been registered, the CPU core 21 returns to the process of step S23.

If the coordinate position has been registered, the line drawing operation being carried out, the CPU core 21 calculates the speed at which the line drawing operation is being carried out from the coordinate position input on this occasion and the coordinate positions registered in the WRAM 22 (step S27). Then, the CPU core 21 determines whether or not the calculated line drawing speed is equal to or greater than the prescribed speed (immediately after starting the line drawing operation, the prescribed speed is taken to be lower) (step S28). If it is not equal to or greater than the prescribed speed, the CPU core 21 proceeds to the process of step S29.

In step S29, if there is an effect being displayed on the second LCD 12, the CPU core 21 deletes the effect display. Also, if the coordinate position has been registered in the WRAM 22, the CPU 21 deletes the registration of the coordinate position. Then, the CPU core 21 returns to the process of step S21.

If the calculated line drawing speed is equal to or greater than the prescribed speed, the CPU core 21 displays the effect, applying it to the range of the certain width, centered on the coordinate position input on this occasion, on the second LCD 12. Also, the CPU core 21 updates the coordinate position registered in the WRAM 22 to the coordinate position input on this occasion (step S30).

The CPU core 21 determines whether or not the coordinate position input on this occasion is the position in which an action target object 202 is being displayed (step S31). If it is not the position in which an action target object 202 is being displayed, the CPU core 21 returns to the process of step S23. If it is the position in which an action target object 202 is being applied, the CPU core 21, based on whether or not the activation flag 106 has been set for the relevant action target object 202 in the action management table 100, determines whether or not the effect 105 set for the action target object 202 has been activated (step S32).

If the effect 105 set for the action target object 202 has already been activated, the CPU core 21 returns to the process of step S23. If the effect 105 set for the action target object 202 has not yet been activated, the CPU core 21 activates the effect 105 set for the action target object 202, and sets the activation flag 106 (step S33). Then, the CPU core 21 returns to the process of step S23.

As described heretofore, in the action RPG according to the embodiment, at the time of fixing the images in accordance with the input of the L button 14f, when the line drawing operation from the display position of the action source object 201 to the display positions of the action target objects 202 is carried out at or faster than the prescribed speed, in the condition in which the action source object 201, and the action target objects 202 which form pairs with the action source object 201, are displayed on the second LCD 12, the effect 105 set for the action target object 202 is activated.

Herein, the position of the viewpoint 303 of the virtual camera 301 changes in accordance with the movement of the player character 200 on the field. In addition, the position of the viewpoint 303 is delicately controlled near the action source object 201. Then, the coordinate position input by the line drawing operation changes depending on the position of the viewpoint 303 of the virtual camera 301. In this case, the player being able to obtain an advantage in the implementation of the game by inputting the coordinate position which changes in accordance with the position of the player character 200 moved by the operation of the arrow key 14c, game performance is improved.

It can also happen that there exist a plurality of action target objects 202 which form pairs with one action source object 201. Even when the player character 200 is in a range on the field in which it is possible to include the action source object 201 and the plurality of action target objects 202 in the visible range, the viewpoint 303 of the virtual camera 301 moves further in accordance with a difference in position within the range, and the positional relationship between the action source object 201 and the plurality of action target objects 202, in a case in which the position of the viewpoint 303 of the virtual camera 301 is taken as a reference, are decided. In this way, the positional relationship between the action source object 201 and the plurality of action target objects 202 displayed on the first LCD 11 (on the second LCD 12 at the image fixing time), in accordance with the position of the player character 200 on the field, changes.

Herein, the player, in order to activate the effects 105 set for each of the plurality of action target objects 202 with one line drawing operation, has to carry out a line drawing operation, with the action source object 201 as an origin, which passes through each of the plurality of action target objects 202 at, or faster than, the prescribed speed. By there being a limit to the speed at which the line drawing operation which passes through the plurality of action target objects 202 is carried out, there is a case in which it is comparatively difficult to carry out the line drawing operation, with the action source object 201 as the origin, which passes through each of the plurality of action target objects 202 (for example, the kind of example shown in FIG. 5B-1).

This kind of positional relationship between the action source object 201 and the plurality of action target objects 202 displayed on the first LCD 11 (on the second LCD 12 at the image fixing time) being determined by the movement of the player character 200 on the field, when the player moves the player character 200 on the field by controlling the arrow key 14c, not simply causing the action source object 201 and the plurality of action target objects 202 to be displayed on the first LCD 11, but in what position on the first LCD 11 the action source object 201 and the plurality of action target objects 202 are caused to be displayed also has an effect on the implementation of the game. By this means, by a result of a previously carried out operation of the arrow key 14c effecting the difficulty of a subsequently carried out line drawing operation, the gaming quality is improved.

Although the player, as far as possible, would like to move the player character 200 in such a way that it is easy to carry out the line drawing operation, and carry out the image fixing, an enemy character which appears at a prescribed point on the field of the virtual three-dimensional space carries out an attack on the player character 200. For this reason, in order to cause both the action source object 201 and the action target object 202 to be displayed on the first LCD 11 (on the second LCD 12 at the image fixing time) without undergoing the attack by the enemy character, it is necessary to move the player character 200 while helping the player character 200 to escape from the attack by the enemy character, or while causing it to counterattack. By this means, in practice, a temporal restriction arising with regard to the player moving the player character 200 in such a way that it is easy to carry out the line drawing operation, game performance other than simply moving the position arises for the movement operation of the player character 200.

In particular, even in a condition in which the action source object 201 and the plurality of action target objects 202 are already being displayed on the first LCD 11, a temporal restriction also arises for moving the player character 200 in such a way that the positional relationship with the action source object 201 and the plurality of action target objects 202 on the first LCD 11 (on the second LCD 12 at the image fixing time) does not make it more comparatively difficult to carry out the line drawing operation at, or faster than, the prescribed speed. By this means, in connection with the line drawing operation, to be carried out subsequently, for activating the effects 105 set for the action target objects 202, new gaming performance arises for the movement operation of the player character 200.

Also, in the event that the position of the player character 200 in the virtual three-dimensional space is within the prescribed distance (10) from the position of the action source object 201, the position of the viewpoint 303 changes in accordance with not only the position of the player character 200, but also the positional relationship with the action source object 201 and the action target objects 202. By this means, when the action source object 201 and the action target objects 202 are displayed on the first LCD 11 (on the second LCD 12 at the image fixing time), the viewpoint 303 being delicately controlled by even a slight movement of the player character 200, a considerable effect is had by the display positions of the action source object 201 and the action target objects 202 displayed on the first LCD 11 (on the second LCD 12 at the image fixing time). Consequently, when moving the player character 200 by controlling the arrow key 14c too, a more precise control being required, the gaming quality is improved.

Also, at the image fixing time, in the event that the line drawing operation from the action source object 201 is carried out, an effect is displayed on the second LCD 12, applied to the range of the certain width, centered on the input positions. Herein, the line drawing operation from the action source object 201 to the action target objects 202 being shown by the effect, by the effect being positioned at the action target objects 202, the effects 105 set for the action target objects 202 are activated. By this means, the action source object 201 and the action target objects 202 forming pairs, the player can easily recognize that the effect 105 has been activated. By means of this effect, it is possible to recognize that a line drawing operation enabling the activation of the effect 105 is being continued, even before the line drawing operation reaches the action target objects 202.

Also, the effects 105 set for the action target objects 202 can only be activated at the image fixing time. At the image fixing time, the movements of the player character 200 and the enemy characters stop. As the position of the player character 200 does not change, the viewpoint 303 of the virtual camera 301 depicted on the second LCD 12 also stops. Herein, it is possible to effectively show the player the activation of the effects 105 set for the action target objects 202, without being affected by an implementation of another game.

Also, in the condition in which the images are fixed, the player carries out the line drawing operation on the touch panel 13 attached to the front surface of the second LCD 12. In the condition in which the images are fixed, the screen displayed on the second LCD 12 is the game screen displayed on the first LCD 11 at the normal time (one which is generated by a perspective transformation of the virtual three-dimensional space). In the condition in which the images are fixed, the player being able to carry out the line drawing operation by intuitively inputting, via the touch panel 13, the coordinates of the display positions, on the game screen being displayed on the second LCD 12, of the action source object 201 and the action target objects 202, the game quality is improved.

Furthermore, the touch panel 13 being disposed on the front surface of the second LCD 12 means that it is not disposed on the front surface of the first LCD 11. When the images are not put into the fixed condition, with the game image being displayed on the first LCD 11, and the commands displayed on the second LCD 12, it is possible to input the commands via the touch panel 13. Contrarily, when the images are put into the fixed condition, the game image being displayed on the second LCD 12, it is possible to activate the effect 105 by carrying out the line drawing operation from the action source object 201 to the action target objects 202 here. As it is possible, by switching the screens of the first LCD 11 and second LCD 12 in this way, to use the touch panel 13 for both the input of the commands and the line drawing operation, it is possible to avoid superfluous hardware.

The invention not being limited to the heretofore described embodiment, a variety of modifications and applications are possible. Hereafter, a description will be given of modified aspects of the heretofore described embodiment which are applicable to the invention.

In the heretofore described embodiment, as long as the line drawing operation continued at, or faster than, the prescribed speed, is carried out from the action source object 201 to the action target object 202 which forms a pair with the action source object 201, there is no restriction on the time taken to reach the display position of the action target object 202 in order to activate the effect 105. As opposed to this, it is also acceptable to provide a restriction on the time of the line drawing operation for which it is possible to activate the effect 105. In this case, it is acceptable to display an effect on the second LCD 12, applying it to the range of the certain width, centered on the positions input by the line drawing operation on the touch panel 13, from the start of the line drawing operation until the time limit elapses.

In this case, the greater the distance from the action source object 201 to the action target object 202 displayed on the second LCD 12 at the image fixing time, the more difficult it becomes to carry out the line drawing operation from the action source object 201 to the action target object 202 within the time limit. Also, in the event that a plurality of action target objects 202 have been set, the player, in order to acquire the effects 105 set one for each of the plurality of action target objects 202, has to carry out the line drawing operation, with the action source object 201 as the origin, which passes through each of the plurality of action target objects 202 within the time limit. By providing a limit on the time required for the line drawing operation which passes through the plurality of action target objects 202, it can happen that there is a case in which it is comparatively difficult to carry out the line drawing operation, with the action source object 201 as the origin, which passes through each of the plurality of action target objects 202.

In this case too, when the player moves the player character 200 on the field via the operation of the arrow key 14c too, a more delicate operation being required, the game performance is improved. Also, the effect is displayed from the start of the line drawing operation until the time limit elapses. By this means, it is possible for the player to easily recognize that the line drawing operation is being carried out in a condition in which the effect 105 can be activated.

In the heretofore described embodiment, an effect 105 is set in the action management table 100 for each action target object 202. As opposed to this, it is also acceptable that an effect 105 is set for each action source object 201. Herein, in the case in which there are a plurality of action target objects 202 which form pairs with one action source object 201, it is possible to arrange that, in a case in which all of the plurality of action target objects 202 which form the pairs are connected by the line drawing operation, this activates the effects set against the action source object 201. Herein, it is acceptable to provide a limit on the speed at which the line drawing operation is carried out, and it is also acceptable to provide a limit on the time required to carry out the line drawing operation. By one effect being set for the plurality of action target objects 202 as a whole in this way, as it is meaningless to carry out the line drawing operation divided into a plurality of occasions, the positional relationship between the action source object 201 and the plurality of action target objects 202 takes on an importance, and the advantage of the invention appears more markedly.

In the heretofore described embodiment, in the case in which the position of the player character 200 is within the prescribed distance (10) from the position of the action source object 201, the position of the viewpoint 303, being changed from the normal control, changes in accordance with the positional relationship between the action source object 201 and the player character 200. As opposed to this, it is acceptable that the changing of the position of the viewpoint 303 from the normal control is either carried out in accordance with the relationship between the position of the player character 200 and the position of the action target object 202, or carried out in accordance with the relationship between the position of the player character 200, the position of the action source object 201 and the position of the action target object 202.

In the heretofore described embodiment, at the image fixing time, in the case in which the action source object 201, and the plurality of action target objects 202 which form pairs with the action source object 201, are displayed on the second LCD 12, in both a case in which the action source object 201 and the plurality of action target objects 202 are connected by one line, and a case in which they are connected by a plurality of lines, the effects 105 set for the action target objects 202 are activated in the same way. As opposed to this, it is also acceptable that the effect activated at the action target object 202 differs depending on a way in which the line drawing operation is carried out. In this case, it is preferable that the effect 105 activated by drawing the line, with the action source object 201 as the origin, which passes through each of the plurality of action target objects 202 is superior to the effect 105 activated by drawing a line from the action source object 201 to each action target object 202.

In the heretofore described embodiment, when the line drawing operation has been carried out from the position of the action source object 201 to the position of the action target object 202 in the image displayed on the second LCD 12, in the condition in which the images are fixed, the effect 105 set in the action management table 100 for the action target object 202 is activated. As opposed to this, it is also acceptable that the effect 105 activated is fixed by a prescribed method. For example, it is acceptable that the effect 105 activated differs in accordance with the time required for the line drawing operation. Also, it is also acceptable that the effect 105 activated differs in accordance with a length of a line for which the line drawing operation is being carried out.

In the heretofore described embodiment, the action target object 202 being taken to exist at a prescribed point on the field of the virtual three-dimensional space, as long as it is included in the visible range, it is displayed on the first LCD 11 (on the second LCD 12 at the image fixing time). As opposed to this, it is also acceptable that any one of the action target objects 202, not being displayed at the normal time, is displayed by fulfilling a prescribed condition. For example, it is acceptable that the action target object 202, not being displayed in the image displayed on the first LCD 11, is displayed only on the second LCD 12 in the condition in which the images are fixed. Also, it is also acceptable that, the action target object 202 being an invisible object at first, when a prescribed line drawing operation is carried out, with the action source object 201 as the origin, as far as the invisible action target object 202, the action target object 202 changes to being visible, and is displayed on the second LCD 12 for the first time.

In the heretofore described embodiment, the action source object 201 and the action target object 202 exist at prescribed points on the field of the virtual three-dimensional space. As opposed to this, it is also acceptable that the action source object 201 and/or the action target object 202 move in the virtual three-dimensional space (although a distance between the two is maintained within a certain range), and stop moving at the image fixing time. For example, it is acceptable that the action source object 201 is an item belonging to the player character 200. In this case, a further minuteness being required of the movement operation of the position of the player character 200 in accordance with the movement of the action source object 201 and/or the action target object 202, an improvement of the gaming quality is achieved.

In the heretofore described embodiment, when the line drawing operation is carried out from the position of the action source object 201 to the position of the action target object 202 in the image displayed on the second LCD 12, in the condition in which the images are fixed, the effect 105 set for the action target object 202 is activated. As opposed to this, it is also acceptable that an object (hereafter referred to as an "invalidated object") exists on the field of the three-dimensional space, through which the line drawing operation in the image displayed on the second LCD 12, in the condition in which the images are fixed, may not pass. Also, it is also acceptable that an object exists which, by being passed through, results in a reduction of a prescribed parameter.

In this case, a positional relationship of the action source object 201, the action target object 202, and the invalidated object displayed on the first LCD 11 (on the second LCD 12 at the image fixing time) is decided by the movement of the player character 200 on the field. When moving the player character 200 by controlling the arrow key 14c, not simply causing the action source object 201 and the action target object 202 to be displayed on the first LCD 11 (on the second LCD 12 at the image fixing time), but in what position on the first LCD 11 (on the second LCD 12 at the image fixing time) the action source object 201, the action target object 202, and the invalidated object are caused to be displayed also has an effect on the implementation of the game. By this means, by a result of the operation of the arrow key 14c having a larger effect on the difficulty of the line drawing operation, the game performance further improves.

In the heretofore described embodiment, the movements of the enemy character stop at the image fixing time. As opposed to this, it is also acceptable that the movements of the enemy character do not stop at the image fixing time either. In this case, the enemy character also carrying out an attack on the player character 200 while the line drawing operation is being carried out, in order to activate the effect 105 without undergoing the attack by the enemy character, it is necessary to move the player character 200 while helping the player character 200 to escape from the attack by the enemy character, or while causing it to counterattack, fix the images and, in the condition in which the images are fixed, carry out the line drawing operation before undergoing the attack by the enemy character. By this means, in practice, a temporal restriction arising with regard to the player moving the player character 200 in such a way that it is easy to carry out the line drawing operation, and with regard to the line drawing operation, the gaming performance improves.

In the heretofore described embodiment, the invention is applied to the action RPG in which the effect 105 set for the action target object 202 is activated, but it is also acceptable to apply the invention to another kind of game. For example, it is acceptable that, in a normal RPG in which a screen switches and a battle is started when the player character moves to a prescribed point on the field, the action source object and the action target object are positioned on a battlefield, and it is possible, by the line drawing operation from the action source object to the action target object, to make an attack on the enemy character. In this case, it is acceptable to arrange that, in the event that the line drawing operation fails, the attack due to the line drawing operation from the action source object to the action target object becomes impossible in that battle scene.

In the heretofore described embodiment, the coordinate positions are input via the touch panel 13 disposed on the front surface of the second LCD 12. Naturally, a device which inputs the coordinate positions not being limited to the touch panel 13, it is also acceptable to use another pointing device, such as a mouse which carries out the inputting of the coordinates via a position of a cursor displayed on the display device. In the event of inputting the coordinate positions using the mouse, it is possible, for example, to make the line drawing operation a dragging operation.

In the heretofore described embodiment, the apparatus 1 includes the two display devices, the first LCD 11 and the second LCD 12. As opposed to this, it is also acceptable that there is one display device. In the event that the touch panel is used as the device which inputs the coordinate positions, it can be arranged that the touch panel is disposed on the front surface of the one display device. Also, in the event that there is only one display device, although obviously no switching of the screens occurs, it is possible to arrange in such a way that the fixing and release of the images is possible by a prescribed operation of the player.

In the heretofore described embodiment, the description has been given exemplifying with the case in which the action RPG to which the invention is applied is executed in the apparatus 1, which includes the two display devices, the first LCD and second LCD 12, and the pointing device referred to as the touch panel 13. However, as long as it includes at least a display device which displays the game image, and a pointing device which can input the player's desired coordinate positions, it is acceptable to execute a game to which the invention is applied in a computer device other than the apparatus 1. It being acceptable that the computer device which executes the game to which the invention is applied is either a dedicated game machine or a general-purpose personal computer, it matters not whether it is a portable type or a fixed type. Also, it is also possible to utilize a portable telephone as the computer device which executes the game to which the invention is applied.

In the heretofore described embodiment, the program and data of the apparatus 1 are distributed stored in the ROM 171 of the game cartridge 17. Naturally, the recording medium which stores the program and data not being limited to this kind of article, it is also possible to utilize an optical and/or magnetic disc device (such as a flexible disc, a CD-ROM or a DVD-ROM), in accordance with an aspect of the computer device which forms a platform. In the event that a computer device including a fixed disc device is used as the platform, it is acceptable that the program and data are distributed stored in advance in the fixed disc device.

Furthermore, in the event that a computer device capable of communication with another computer device via a network is utilized as the platform, it is acceptable that the program and data are stored in a fixed disc device included in a server device which exists on the network, and distributed via the network.

What is claimed is:

1. A game device, comprising:
   a character mover which, in accordance with a first operation by a player, moves a player character in a virtual three-dimensional space, a first object and a second object being provided in the virtual three-dimensional space, a prescribed effect being set for the second object, forming a pair with the first object;
   a viewpoint mover which moves a viewpoint of a virtual camera in accordance with movement of the player character by the character mover;
   a perspective transformer which projects a prescribed range of the virtual three-dimensional space, including at least the player character, onto a virtual screen from a position of the viewpoint moved by the viewpoint mover, and generates a two-dimensional game image;
   a game image display which displays the two-dimensional game image generated by the perspective transformer; and
   a coordinate position input which, in accordance with a second operation by the player, inputs an optional coordinate position corresponding to a coordinate position on the game image display, wherein
   the perspective transformer, when the player character moves within the prescribed range of the virtual three-dimensional space, sets the prescribed range for perspective transformation to project both the first object and the second object, along with the player character, onto the virtual screen, and display the first object, the second object and the player character on the game image display, and
   further comprising:
      a game effect activator which, when a locus from a first coordinate position in which the first object is displayed to a second coordinate position in which the second object is displayed is input by the coordinate position input, where both the first object and the second object are displayed on the game image display, activates the prescribed effect, set for the second object, during an implementation of a game.

2. The game apparatus according to claim 1, further comprising:
   an effect display which, when both the first object and the second object are displayed on the game image display, applies the prescribed effect to the locus of the first coordinate position in which the first object is displayed and the second coordinate position in which the second object is displayed when the locus is input by the coordinate position input, and displays the prescribed effect on the game image display, superimposed on the two-dimensional game image generated by the perspective transformer.

3. The game apparatus according to claim 1, wherein the game effect activator, when the locus from the first coordinate position in which the first object is displayed to the second coordinate position in which the second object is displayed is input at, or faster than, a prescribed speed, activates the prescribed effect set for the second object.

4. The game apparatus according to claim 1, wherein the game effect activator, when the locus from the first coordinate position in which the first object is displayed to the second coordinate position in which the second object is displayed is input within a prescribed time, activates the prescribed effect set for the second object.

5. The game apparatus according to claim 1, wherein a plurality of second objects that form pairs with the first object is provided in the virtual three-dimensional space, where prescribed effects, during the implementation of the game, are each set for one of the plurality of second objects,
   the perspective transformer, when the player character is within a prescribed plurality of display ranges of the virtual three-dimensional space, sets prescribed ranges for perspective transformation so that each of the plurality of second objects is projectable, along with the first object, onto the virtual screen, and displays each of the plurality of second objects and the first object on the game image display, and
   the game effect activator, when a second locus, with the first object as an origin, passing through each of the plurality of second objects, is input by the coordinate position input, where the plurality of second objects are displayed on the game image display along with the first object, activates each of the prescribed effects, during the implementation of the game, set for each of the plurality of second objects on the second locus.

6. The game apparatus according to claim 5, wherein the game effect activator, where the second locus which passes through each of the plurality of second objects, with first object as the origin, has been input at, or faster than, a second prescribed speed, activates all of the prescribed effects, during the implementation of the game, set for each of the plurality of second objects on the second locus.

7. The game apparatus according to claim 5, wherein the game effect activator, where the second locus which passes through each of the plurality of second objects, with the first object as the origin, is input within a second prescribed time, activates all of the prescribed effects during the implementation of the game, set for each of the plurality of second objects on the second locus.

8. The game apparatus according to claim 1, wherein a plurality of second objects that form pairs with the first object is formed in the virtual three-dimensional space, where prescribed effects, during the implementation of the game, are set for the plurality of second objects as a whole,
   the perspective transformer, when the virtual three-dimensional space of the player character is within a prescribed plurality of display ranges, sets prescribed ranges for perspective transformation so that all of the plurality of second objects are projectable, along with the first object, onto the virtual screen, and displays each of the plurality of second objects and the first object on the game image display, and
   the game effect activator, when a second locus, with the first object as an origin, passing through each of the plurality of second objects, is input by the coordinate position input, where the plurality of second objects are displayed on the game image display along with the first object, activates all of the prescribed effects, during the implementation of the game, set for the plurality of second objects on the second locus as a whole.

9. The game apparatus according to claim 8, wherein
the game effect activator, where the second locus which passes through each of the plurality of second objects, with the first object as the origin, is input at, or faster than, the prescribed speed, activates all of the prescribed effects, during the implementation of the game, set for the plurality of second objects on the second locus as a whole.

10. The game apparatus according to claim 8, wherein
the game effect activator, where the second locus which passes through each of the plurality of second objects, with the first object as the origin, is input within the prescribed time, activates all of the prescribed effects, during the implementation of the game, set for the plurality of second objects on the locus as a whole.

11. The game apparatus according to claim 1, wherein
the virtual three-dimensional space comprises an enemy character that approaches the player character at a speed equal to or slower than a maximum speed of the movement of the player character by the character mover and attacks the player character.

12. The game apparatus according to claim 1, wherein
the virtual three-dimensional space comprises, in a vicinity of the first object and the second object, a third object which invalidates the prescribed effect, and
the game effect activator, when the locus from the first coordinate position in which the first object is displayed to the second coordinate position in which the second object is displayed is input by the coordinate position input, without passing through a third coordinate position in which the third object is displayed, activates the prescribed effect, set for the second object, during the implementation of the game.

13. The game apparatus according to claim 1, wherein
the first object or the second object moves in the virtual three-dimensional space, while maintaining a distance amongst each other within a second prescribed range.

14. The game apparatus according to claim 1, further comprising:
a player character stopper which, in accordance with a third operation by the player, stops the movement of the player character by the character mover, wherein
the game effect activator, when the locus from the first coordinate position in which the first object is displayed to the second coordinate position in which the second object is displayed is input by the coordinate position input, where the movement of the player character is stopped by the player character stopper, and both the first object and the second object are displayed on the game image display, activates the prescribed effect.

15. The game apparatus according to claim 1, wherein
the viewpoint mover, when the player character is positioned within a vicinity range set in a vicinity of the first object or the second object, controls the movement of the viewpoint of the virtual camera in accordance with the movement of the player character differently from when the player character is positioned outside the vicinity range.

16. The game apparatus according to claim 1, wherein
the coordinate position input, being disposed on a front surface of the game image display, is a touch panel which transmissively displays an image displayed on the game image display.

17. A game implementation method which, being executed in a game apparatus including a display which displays a game image, and a coordinate position input which, in accordance with a first operation by a player, inputs an optional coordinate position on the display, implements a game by moving a player character in a virtual three-dimensional space, a first object and a second object being provided in the virtual three-dimensional space, a prescribed effect being set for the second object, forming a pair with the first object, the method comprising:
moving the player character in the virtual three-dimensional space, in accordance with a second operation by the player;
moving a viewpoint of a virtual camera in accordance with the movement of the player character;
setting a prescribed range for perspective transformation, when the player character moves within a prescribed range of the virtual three-dimensional space, so that both the first object and the second object, along with the player character, are projectable onto a virtual screen, and displays the first object, the second object and the player character on the display, projecting the prescribed range of the virtual three-dimensional space, including at least the player character, onto the virtual screen from a position of a viewpoint of the virtual camera, and generating a two-dimensional game image;
displaying the two-dimensional game image generated by the perspective transformation on the display; and
activating the prescribed effect, set for the second object, during the implementation of the game, when a locus from a first coordinate position in which the first object is displayed to a second coordinate position in which the second object is displayed is input by the coordinate position input, where both the first object and the second object are displayed on the display.

18. A non-transitory computer readable recording medium including a program executable on a computer, comprising a display which displays an image of a game implemented by moving a player character in a virtual three-dimensional space, a first object and a second object being provided in the virtual three-dimensional space, a prescribed effect being set for the second object, forming a pair with the first object, and a coordinate position input which, in accordance with a first operation by a player, inputs an optional coordinate position on the display, the computer readable recording medium, comprising:
a character moving code section, which, when executed, causes the player character to move in the virtual three-dimensional space, in accordance with a second operation by the player;
a viewpoint moving code section, which, when executed, causes a viewpoint of a virtual camera to move in accordance with the movement of the player character;
a perspective transformation code section, which, when executed, when the player character moves within a prescribed range of the virtual three-dimensional space, causes a prescribed range to be set for perspective transformation so both the first object and the second object, along with the player character, are projectable onto a virtual screen, and further causes the first object, the second object and the player character to be displayed on the display, projecting the prescribed range of the virtual three-dimensional space, including at least the player character, onto the virtual screen from a position of the viewpoint of the virtual camera, and generating a two-dimensional game image; and
a game image display code section, which, when executed, causes the two-dimensional game image generated by the perspective transformation code section to be displayed on the display.

19. A computer comprising the non-transitory computer readable recording medium according to claim 18.

* * * * *

UNITED STATES PATENT AND TRADEMARK OFFICE
CERTIFICATE OF CORRECTION

| | | |
|---|---|---|
| PATENT NO. | : 7,938,724 B2 | Page 1 of 1 |
| APPLICATION NO. | : 11/860971 | |
| DATED | : May 10, 2011 | |
| INVENTOR(S) | : M. Kamiyama et al. | |

It is certified that error appears in the above-identified patent and that said Letters Patent is hereby corrected as shown below:

At column 26, line 41 (claim 7, line 5), after "effects", insert --,--.

At column 28, line 10 (claim 17, line 15), after "with", delete "the".

Signed and Sealed this
Sixteenth Day of August, 2011

David J. Kappos
*Director of the United States Patent and Trademark Office*